United States Patent [19]

Parker et al.

[11] Patent Number: 4,628,989
[45] Date of Patent: Dec. 16, 1986

[54] DEVICE FOR HEAT RECOVERY

[75] Inventors: Robert Parker, Alamo; Thomas D. Ratzlaff, Menlo Park; Dennis C. Siden, Portola Valley, all of Calif.

[73] Assignee: Raychem Corporation, Menlo Park, Calif.

[21] Appl. No.: 381,494

[22] Filed: May 24, 1982

[51] Int. Cl.⁴ .................... B22B 31/00; B30B 5/02; B30B 15/34; H05B 3/58
[52] U.S. Cl. ............................ 165/46; 165/40; 165/104.32; 219/535; 156/85; 156/86; 156/583.3; 264/342 R; 425/389
[58] Field of Search ............ 165/80 E, 46, 47, 104.27, 165/104.32, 40, 83; 219/535, 212; 264/342 R, 313, 314, 315; 425/383, 389, 440; 128/400, 402; 156/84, 85, 86, 583.3

[56] References Cited

U.S. PATENT DOCUMENTS

| | | |
|---|---|---|
| 2,027,962 | 1/1936 | Currie . |
| 2,101,252 | 12/1937 | Guinzburg .......................... 425/389 |
| 2,489,643 | 11/1949 | Hunter ................................ 219/535 |
| 2,960,147 | 11/1960 | Ferrell .............................. 156/583.3 |
| 3,086,242 | 4/1963 | Cook et al. . |
| 3,186,404 | 6/1965 | Gardner ............................. 128/402 |
| 3,551,223 | 12/1970 | Deal et al. . |
| 3,553,970 | 1/1971 | Wiswell, Jr. ........................ 128/402 |
| 3,580,795 | 5/1971 | Eichenlaub ....................... 156/583.3 |
| 3,924,603 | 12/1975 | Chapin . |
| 3,957,962 | 5/1976 | Ramsbotham . |
| 4,007,781 | 2/1977 | Masters ................................ 165/46 |
| 4,019,020 | 4/1977 | Bilbee et al. ......................... 165/46 |
| 4,132,578 | 1/1979 | Gell, Jr. ............................ 156/583.3 |
| 4,170,296 | 10/1979 | Wetmore . |
| 4,265,216 | 5/1981 | Marshall et al. . |
| 4,283,239 | 8/1981 | Gorke et al. ......................... 156/86 |
| 4,428,789 | 1/1984 | Masaaki et al. ....................... 156/85 |
| 4,523,594 | 6/1985 | Kuznetz .............................. 128/402 |

FOREIGN PATENT DOCUMENTS

| | | | |
|---|---|---|---|
| 6099629 | 8/1981 | Japan .................................... 156/86 |
| 0082023 | 5/1982 | Japan .................................... 156/86 |
| 454325 | 2/1935 | United Kingdom .................. 165/46 |

Primary Examiner—William R. Cline
Assistant Examiner—John K. Ford
Attorney, Agent, or Firm—Edith A. Rice; T. Gene Dillahunty

[57] ABSTRACT

Recovery of a heat recoverable article can be carried out without a flame by wrapping around the article a flexible bag and introducing into the bag a liquid of sufficient temperature and heat capacity. Uniform recovery is ensured by maintaining a pressure within the bag so it conforms to the changing size or shape of the recovering article.

14 Claims, 8 Drawing Figures

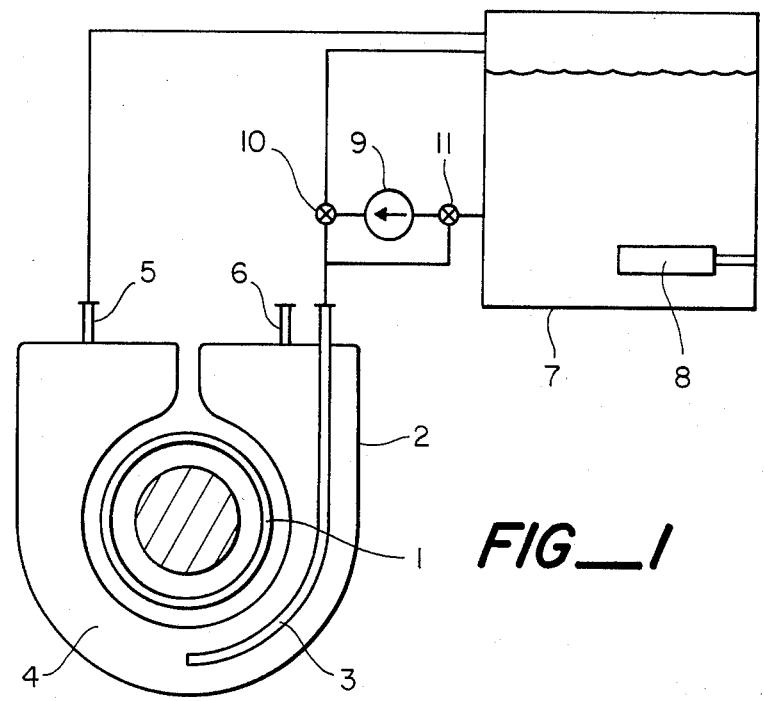
FIG_1
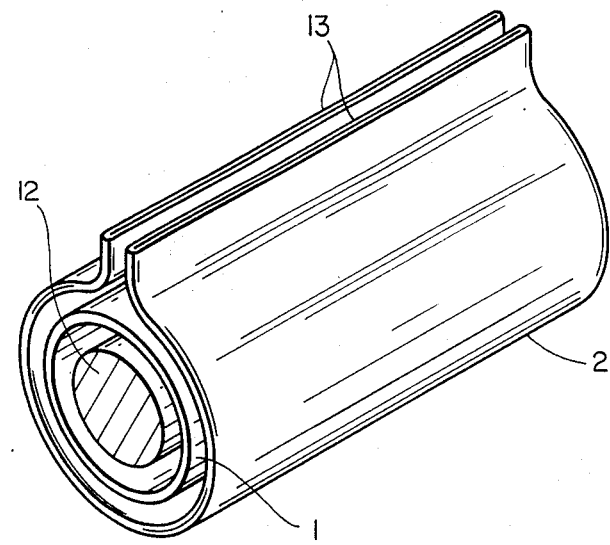
FIG_2

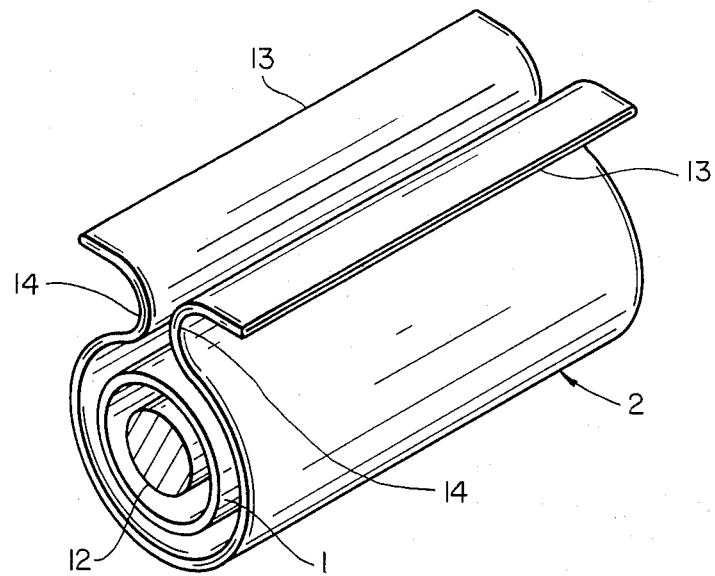
FIG_3A
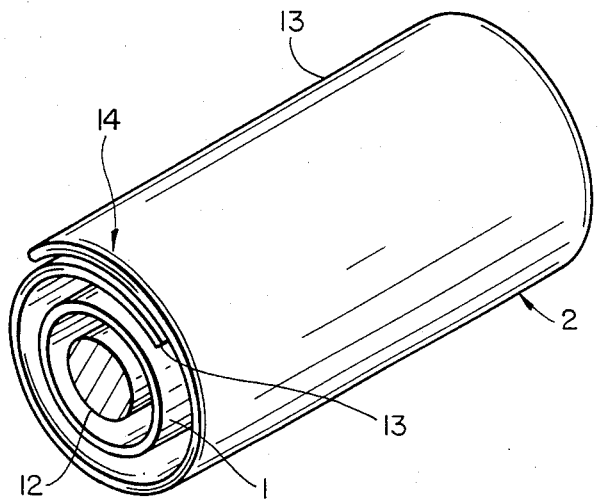
FIG_3B

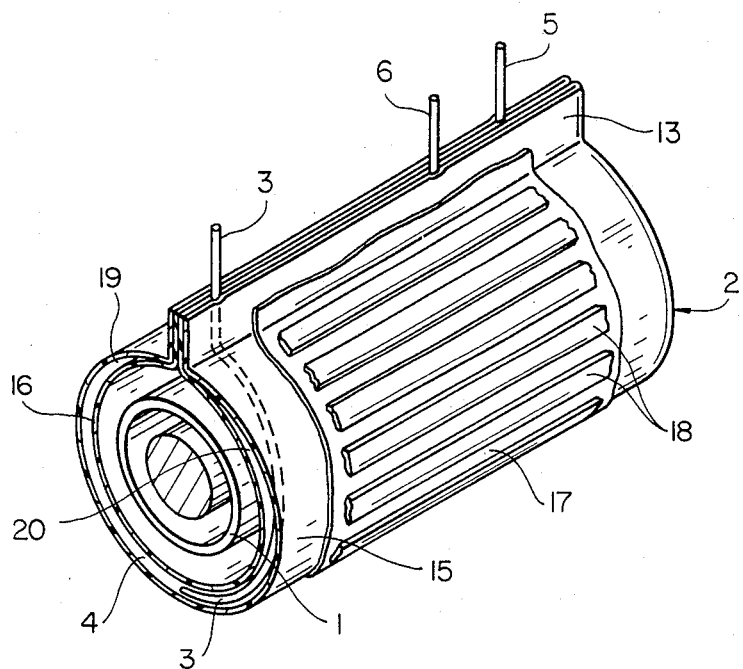
FIG_4
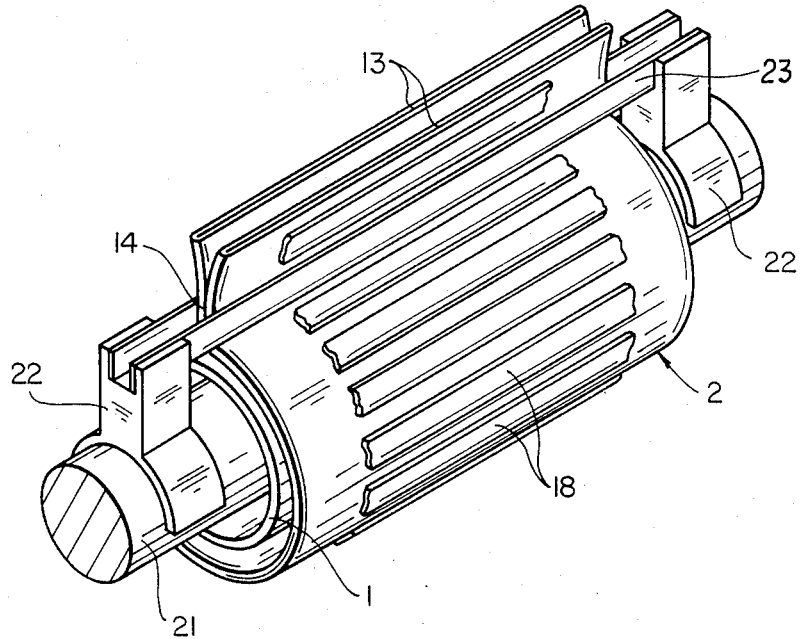
FIG_5

DEVICE FOR HEAT RECOVERY

BACKGROUND OF THE INVENTION

The present invention relates to a technique for recovering a heat recoverable article.

A heat recoverable article is an article the dimensional configuration of which may be made substantially to change when subjected to heat treatment. Usually these articles recover, on heating, towards an original shape from which they have previously been deformed but the term heat-recoverable, as used herein, also refers to an article which, on heating, adopts a new configuration even if it has not been previously deformed.

In their most common form, such articles comprise a heat-shrinkable sleeve made from a polymeric material exhibiting the property of elastic or plastic memory as described, for example, in U.S. Pat. Nos. 2,027,962, 3,086,242 and 3,957,962. The disclosures of these patents are incorporated herein by reference. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat-stable article is deformed to a dimensionally heat-unstable form in a separate stage.

In the production of heat-recoverable articles, the polymeric material may be cross-linked at any stage in the production of the article that will enhance the desired dimensional recoverability. One manner of producing a heat-recoverable article comprises shaping the polymeric material into the desired heat-stable form, subsequently cross-linking the polymeric material, heating the article to a temperature above the crystalline melt point, or, for amorphous material, the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape. The present invention is concerned with a technique by which heat recovery may be induced.

Heat-recoverable articles find particular use in the encapsulation, insulation or mechanical protection of substrates such as electrical cables, optical fiber cables and other supply lines. The function of the recoverable article can be enhanced if it is used in conjunction with a sealant. Where the article is hollow, a sleeve or a boot for example, it may be coated on its inner surface with an adhesive in order to avoid any leak path between the article and the substrate to be protected. Such sealant is preferably heat-activatable, and may be a mastic which softens with heat, a hot-melt adhesive which melts, or an epoxy or other reactive system which cures. In each of these cases recovery of the article and activation of the adhesive can be performed by a single heating operation.

The most widely used means of heating is a butane or propane torch. A gentle flame is played over the recoverable article to cause recovery, and, if applicable, activation of an adhesive, without causing any damage to the article or the substrate over which it is being recovered. This method has the advantages that the same equipment can be used on most sizes of recoverable articles and for most recovery temperatures, and that the equipment is readily available; however, some skill is required if uniform recovery without damage is to be achieved and it is wasteful of energy since much is lost in convection and conduction. A more serious disadvantage is that naked flames are not permitted in hazardous areas, and a torch cannot therefore be used for effecting repairs there. Repairs on leaking gas pipes, unless proper ventilation is provided, are preferably carried out by methods which avoid the use of a naked flame.

One source of heat which avoids a naked flame is hot air. For smaller recoverable articles, such as electrical connectors marketed under the Raychem trade mark Solder Sleeve, a hot-air gun powered by electricity may be used. Such a technique has not, however, found wide use with larger articles.

A further heater that has been used in hazardous areas is the catalytic heater. A reasonably effective heat source is provided by clamping around the recoverable article a rigid hinged structure containing a chemical compositon which initiates an exothermic reaction when supplied with propane or other combustible gas. The device however is rather bulky and does not conform closely to the article to be recovered. Any one size of catalytic heater can be used only on a very small range of sizes of recoverable article.

Exothermic reactions have also been made use of, for example in U.S. Pat. Nos. 3,551,223, 3,924,603, 4,170,296 and 4,265,216.

In the first of these, a device is provided for heating a heat recoverable article, the device comprising a shield, one surface of which is close to or contacts the article, the other surface being covered with a material capable of liberating a predetermined amount of heat energy substantially uniformly around the surface of the recoverable article. The material is lit for example with a match, and then burns uniformly over the surface of the shield. This technique clearly cannot be used where naked flames are not permitted.

U.S. Pat. No. 3,924,603 discloses a method of shrinking a sleeve holding together two cables. A portable heat source containing for example a metal salt, or polyalcohol and an amine is conformed around the sleeve. An exothermic reaction between these chemicals generates the heat for recovery.

In U.S. Pat. No. 4,170,296 a heat recoverable article passes through a box having two compartments, into each of which has been placed one component of a two part exothermic reaction mixture. The partition separating the two compartments is removed allowing the two components exothermically to react.

A flexible container, again divided into two compartments containing reaction components, is disclosed in U.S. Pat. No. 4,265,216. This flexible container is placed around an article to be recovered, and the partition dividing the two compartments is removed or ruptured. A further feature is however introduced: the container itself has at least one face which is recoverable and therefore follows the change in shape or size of the article to be recovered. This system will, in general, only be useable once since the components will then have undergone an irreversible exothermic reaction and the container will have recovered.

We have now devised a way of inducing recovery which is applicable to a wide variety of sizes of recoverable articles, which does not require a naked flame and which involves equipment that is reuseable. This is done by using a liquid to transfer heat energy from the initial energy source to the recoverable article. Although the invention is of primary use in causing heat recovery, it can be used to cause heating for other purposes.

SUMMARY OF THE INVENTION

The present invention therefore provides a device for recovering a heat-recoverable article, which comprises:
(a) a container impermeable to hot fluid, preferably to fluid at 100° C. and more preferably also to fluid at 200° C. which has a flexible surface that can be wrapped around the article;
(b) closure means for holding opposite edge portions of the container, to cause said surface to adopt the wrapped configuration;
(c) means for supporting the weight of said fluid;
(d) a conduit for introducing fluid directly to a region of the container substantially mid-way between said edge portions; and
(e) means for venting the container directly at each of said opposite edge portions.

The container is preferably a bag which can be wrapped around the article such that one thickness of the bag contacts the article. The other thickness of the bag may be braced by a series of slats or other elongate members which are held together by, for example, webbing which allows the bag to be wrapped around the article. Such slats would thus constitute the means for supporting the weight of the fluid. Alternatively, the other thickness of the bag may itself be rigid or otherwise strong enough to support the fluid. In this case the means referred to would be provided by the bag itself. The fluid is preferably a liquid rather than a gas or vapor, becuase of the higher heat capacity of liquid, and therefore the means for supporting is preferably robust enough to support a liquid.

The invention also provides a method of recovering a heat-recoverable article, which comprises:
(a) transporting to the article a fluid, preferably a liquid, at a temperature of at least the recovery temperature of the article; and
(b) localizing the fluid in close proximity to the article by means which follows a dimensional change of the article on recovery.

The means which localizes the liquid or other fluid is preferably a container such as a bag having a flexible surface, and a preferred embodiment of the invention thus provides a method of recovering a heat-recoverable article which comprises:
(a) installing around the article a container which has a flexible surface which can enclose the article; introducing into the container a fluid, preferably a liquid, at a temperature of at least the recovery temperature of the article; and
(b) providing a pressure difference across said surface to maintain said surface in close proximity to the article during recovery of the article.

BRIEF DESCRIPTION OF THE DRAWINGS

The invention is illustrated, by way of example, by the accompanying drawings, in which:
FIG. 1 is a schematic representation of the way in which the container of the invention is used;
FIG. 2 shows a container of the invention wrapped around a recoverable article;
FIGS. 3a and 3b show alternative ways by which smaller recoverable articles can be accomodated;
FIG. 4 shows a preferred design of container; and
FIG. 5 shows a preferred mechanism by means of which a container can be held in a wrapped configuration.

GENERAL DESCRIPTION OF THE INVENTION

The pressure difference preferably results simply from the introduction of the liquid or other fluid into the container. Where hot liquid is passed through the container, control valves can be provided on the drain pipes to produce sufficient back pressure. A pressure difference across the flexible surface of from 1 to 5 psi, preferably about 2 psi, will generally be suitable.

The design of the system will depend primarily on the recovery temperature and on the heat capacity of the article to be heat recovered. The shape of the article will also have an influence, but since the bag, or other container, is flexible any one bag will be able to be used for a wide variety of shapes of articles. The invention will be of particular use in the recovery of wraparound and tubular sleeves to be installed around pipes carrying inflammable substances. Such sleeves will generally be of poymeric materials, but it is envisaged that the invention will be useful in inducing the recovery in heat-recoverable metals, such as beta brasses and nickel-titanium alloys. Articles other than sleeves, such as boots and various molded parts may also be recovered using the present invention.

The bag and the liquid must of course be able to withstand at least the recovery temperature, and for quick heating the liquid is desirably supplied at a temperature of up to 50° C. above the recovery temperature. The bag must remain substantially impermeable to the liquid at this temperature.

Flexibility of at least part of the bag is important since efficient heating of the recoverable article demands that there be little or no air gap between the bag and the article throughout the dimensional change of the article that occurs on recovery. Where the article is to be shrunk around substrates of highly varying cross-sectional size, such as bell and spigot joints in gaps pipes, considerable flexibility will be required in the bag. A material which fulfills the requirements of temperature resistance and flexibility is silicone rubber, and a thickness of 0.5 to 1.0 mm, preferably about 0.75 mm, is preferred.

The amount and temperature of the liquid will depend on the following factors, firstly, as mentioned above, the temperature and heat capacity of the recoverable article; and secondly the specific heat capacity of the liquid. The heat conductivity of the liquid, the bag and the sleeve may also be taken into consideration in determining the time required for complete recovery. One can assume that the liquid loses some heat outwardly away from the recoverable article, but provision of insulation on the outer surface of the bag will reduce this factor. A further consideration is the contact area between the bag and the article since the greater the contact, the quicker will thermal equilibrium be attained; however in most cases contact over substantially the entire available recoverable surface will be required for uniform recovery so this will not normally be regarded as a variable to be chosen when designing the system.

The heating system can be static, by which is meant that a chosen amount of liquid is introduced into the bag and recovery awaited or liquid is introduced during the whole period of recovery. Alternatively, hot liquid is continuously introduced into the bag, and cooler liquid withdrawn. The cooler liquid withdrawn may, if desired, be heated and recycled. This operation can be carried out to maintain a certain temperature in the bag, or the recycled liquid can be allowed to get hotter and hotter; this second alternative can save time since part of the heating of the liquid is carried out while the initial stages of recovery are occuring. In any case, it is preferable that the liquid in the bag be maintained at a slight excess pressure in order to force the flexible inner surface of the bag against the article during recovery. In the first instance mentioned where all of the liquid is introduced before recovery is completed, a pressurized air pocket can be left in the bag to allow the flexible surface to follow the conformational change of the article. In a modification of this, the bag can be filled completely with liquid and the pressure can result from the bag being slightly stretched. Where liquid is passed through the bag, controls may be provided on the drain pipes or on the supply or both to maintain an excess pressure in the bag. Liquid entering the bag can be supplied from above the bag, and the resulting pressure head be used to pressurize the bag.

The design requirements can be analyzed by making standard assumptions concerning heat transfer across boundaries. The liquid, the bag and the recoverable article can be assumed to be in good general contact, the temperature gradients across the boundaries can be considered to be zero, and the transfer of heat across each boundary can be considered to be proportional to the temperature of the boundary surface.

DESCRIPTION OF A PREFERRED EMBODIMENT

Following the above general consideration of the requirements of the invention a preferred embodiment, wherein the container is a bag and the fluid is a liquid, will now be discussed.

The means by which the liquid is localized around the substrate is preferably a silicone rubber bag, more preferably a thin walled silicone rubber bag, both thicknesses of which are flexible. In order that the weight of liquid within the bag does not damage the bag and in order to ensure that the liquid is distributed with substantially equal thicknesses around the recoverable article, a support is preferably provided that runs underneath the lower part of the bag when in use.

The bag is wrapped around the recoverable article so that two longitudinal edges of the bag abut above the article. The bag is preferably not wrapped around the article the other way; i.e., with the middle of the bag above the article and the edges below, because the weight of liquid in the lower two parts would then cause a pinch line above the article preventing easy filling and uniform distribution of liquid. It is in general desirable that any means for supporting the bag does not restrict the flow of fluid through the bag. This invention enables recovery of many sizes of article using the same bag and where a small article is to be recovered, portions of the bag some distance from one or both longitudinal edges will meet rather than the edges themselves; and it is for this reason that this Specification refers to edge portions of the bag being held together around the article.

When the bag is in this wrapped configuration, liquid is introduced. In order that the liquid shall remain contained at all times, it is preferred that the bag shall be closed on all edges, except for supply and drain or vent pipes. This will avoid any spillage of hot liquid.

The configuration of the supply and drain or vent pipes is preferably designed with the following considerations in mind. In order to ensure uniform recovery and to prevent entrapment of air between the substrate and the recovered article, recovery should be begun at one region of the article and continued to an opposite region, rather than begun at two opposite regions and worked towards the center. The technique when using a torch to recover a sleeve of modest size, is to begin at one end and to work towards the other. It is in general difficult to follow this with the present bag on a horizontal pipe, but an equally good effect is achieved if filling of liquid occurs steadily from the bottom of the bag upwards. The recoverable sleeve therefore begins to recover underneath the substrate, and air between the sleeve and the substrate is driven out uniformly.

This steady recovery from one part of the sleeve to another can be ensured by introducing the hot liquid directly to the lowermost part of the bag; if the liquid were introduced at the top of the bag and allowed to fall to the bottom it would cause recovery on its way. The part of the bag which will preferably be lowermost is a part midway between the two longitudinal edge portions that are brought together over the top of the article; a supply pipe or other conduit preferably supplies liquid directly to this region. (The reason that the bag is preferably not installed the other way up was mentioned above.)

The supply pipe may enter the bag at one end; or it may enter through one of the two longitudinal edge portions that are held abutting, and then pass inside the bag down to the region described. In the first of these, the seal between the bag and the pipe must withstand the pressure of the head of the liquid in the bag; whereas in the second there need be no pressure at the seal unless pressure resulting from a pressure head or otherwise is used to generate the desired pressure difference across the inner wall of the bag. Where there need be no applied pressure within the bag, the joint along each longitudinal edge is provided primarily to prevent accidental spillage.

Where all edges are sealed, it will be necessary to provide vents to allow air to escape when filling, and air to enter when draining. A vent pipe, preferably with a valve is provided at each longitudinal edge or edge portion. Where the bag is used as described above, a vent in each limb of the bag will be necessary, but in other uses, for example when recovering a vertical sleeve, only one vent will be required. Valves are provided so that a considerable pressure can be maintained in the bag, in order to ensure that an inner surface of the bag follows the substrate during recovery with the expenditure of the minimum energy needed for pumping.

For most applications one or both of the vent pipes can be used as an exit for the liquid where a flow rather than a static system is being used. Hot liquid is continuously pumped or otherwise introduced through the supply pipe, it flows around the bag heating the recoverable article, and then leaves though one or both of the vent pipes.

The bag can conveniently be drained by reversing the pump on the supply pipe, and opening the vents to atmosphere. A positive pressure could be applied to the vents if desired.

The desirability of some means of mechanical support for the bag has already been referred to, but will now be elaborated. Many materials which have suitable flexibility at the required temperature, such as silicone rubbers, cannot support a great weight of liquid if they are sufficiently thin to avoid wrinkling. If used alone, therefore, they would sag underneath the article to be recovered and may fail before sufficient liquid is introduced to produce heating on the upper surfaces of the article. In any case a greater thickness of liquid is likely to be provided at the bottom of the article. In order to allow greater freedom in the construction of the bag itself, and to provide a product which is more easily handled, an outer support layer is preferably provided. Such a support layer may be a sheet of canvas or other heat resistant, substantially non-resilient, flexible material, optionally reinforced with a series of spaced apart longitudinal slats. The canvas (or the bag itself) may be provided with a handle at each longitudinal edge for ease of installation. The weight of liquid will now be carried by the support, and as a result pressure of liquid within the bag will be transmitted to the inner bag surface, causing this surface efficiently to be forced against the recovering surface of the article.

In order for the support to function, it clearly must be held in place around the article. It is also desirable that it can assume a variety of sizes so that the assembly of the bag plus support can be used to recover a variety of sizes of recoverable articles. The means which holds the bag wrapped around the article may be separate from the support. In this case, straps could be provided around the bag, and a support simply provided under the base of the bag, itself supported by the ground or by being hooked to the article. It is preferred, however, that the support be a sheet of canvas on one surface of the bag, which will follow the configuration of the bag around the substrate; the canvas will now have edge portions, corresponding to those of the bag, which are to be held together. A series of slats which reinforce the canvas can also provide this double function of holding the opposite edge portions of the bag and canvas together, and supporting the assembly with respect to the article. A particular use of the invention is for shrinking sleeves onto pipes, in which case the pipe will extend from each end of the sleeve and bag. A frame can be placed on the pipe at each end of the bag, into which protruding parts of the appropriate slats can be inserted in order that the bag assumes a wrapped configuration of the correct diameter. This is illustrated in the accompanying drawings.

The liquid used to supply heat to the recoverable article must have a high heat capacity and be able to withstand at least the recovery temperature of the article. A high heat capacity is required in order that a sufficient amount of heat can be transferred to the article in a reasonably short time. A large amount of stored energy can therefore be introduced suddenly to the article. The use of hot air for recovery was mentioned above as having been used on smaller articles, but the disadvantage is that it is difficult to supply sufficient heat for larger articles without the use of a naked flame to heat the air. Also, hot air retains its heat only a short time, and it must therefore be generated as it is used. Hot liquids, however, can be produced and used sometime later. This provides a further advantage of the present invention, since journey times from one site where recovery is needed to another can be spent heating the liquid; no on-site time is wasted heating or starting up heating apparatus.

It is desirable also that the liquid is of low enough viscosity that it is easily transferred from heater to the bag and back again. It is also preferably of low volatility, non-inflammable, and also pleasant to work with in case any leak develops. The temperatures over which it should be of low volatility and non-inflammable will generally be from 100° to 250° C. depending on the recovery temperature of the article and the means of heating employed. The liquid may be of low viscosity at ambient temperature since this would allow a recovery to be carried out without attention, the bag being drained later after the liquid had cooled. The overall time required for the operation is of course shorter if the bag is drained while hot. It is therefore possible for the liquid that causes recovery to be solid at ambient temperature since in practice preferably all operations are carried out while material is hot. The heat capacity of the liquid is preferably from about 0.4 to about 1. Preferred liquids include oil and glycerine.

A suitable heater for the liquid is an electric immersion heater. Such a heater can be coupled directly to the supply pipe of the bag and the vent or drain pipes can provide a return to the heater if desired. An advantage of this type of heater is that there is no danger of sparking since the heating element is immersed in non-combustible liquid. Where heating is done away from the repair, however the liquid can be heated by a gas-ring or other open flame heater. The container within which the liquid is heated may incorporate a pump and programming controls. This would allow a heating unit to be connected to the bag after wrapping around the article; the program initialed, and the bag left: no further attention being required. There will be no danger of incorrect or non-uniform recovery and no overheating. One operator could therefore begin a second recovery before the first was completed. The heating unit would heat the liquid to the correct temperature, then pump liquid into the bag (or allow filling by gravity feed), regulate its pump speed to maintain the desired excess pressure, stop pumping after a preselected time, and finally drain the bag of liquid. All that the operator needs to do is program the unit for size and recovery temperature of article (this could be calculated, but is simply worked out empirically), then install the bag and connect it to the heating unit, and finally disconnect it when told to do so by the unit.

DESCRIPTION OF THE DRAWINGS

FIG. 1 shows schematically the components that may be used to automate use of the bag of the invention.

A recoverable article 1 is surrounded by the preferred bag 2. The bag is provided with a supply pipe 3 by means of which heating liquid 4 is introduced. Two pipes 5 and 6 are provided in order that each limb of the bag may be filled and emptied, although, for clarity, only one is shown connected. The pipes 5 and 6 are connected to a tank 7 above its liquid level. The tank 7 contains an electric immersion heater 8. Liquid is pumped by pump 9 into the bag 2 through supply pipe 3. The pump 9 may incorporate valves 10 and 11, and is preferably of controllable output. Where the liquid is to be supplied and drained by gravity feed, pump 9 may be dispensed with.

After the liquid in the heating unit has reached the desired temperature, the pump is turned on to fill the bag 2. Heating may be quickened by turning valves 10 and 11 to cause hot liquid to be recirculated from the bottom of tank 7 to the top, by by-passing the bag 2. All that is required to stop the liquid by-passing the bag and to cause it to flow through the bag, is to alter valve 10. The pump may be turned off when the bag is full, and proper recovery awaited; in general, however, pumping will be continued, the liquid 4 being recycled through the bag back to the heating unit. If little mixing occurs in the heating unit and if the unit is large relative to the bag, it will not be necessary to continue heating, since fresh liquid will be passed into the bag throughout the duration of recovery.

When a sufficient time has elapsed for recovery to have occurred, the valves 10 and 11 are altered and operation of the pump 9 causes liquid to be sucked out of pipe 3 and into the top of the tank 7. It will be noted that continuous one way operation of the pump accomplishes the three functions of by-pass recirculation, continuous filling, and emptying. Other arrangements could of course be used where the action of the pump is reversed to accomplish emptying.

The valves 10 and 11 and, if desired, the activity of the pump can be altered automatically to maintain the desired pressure within the bag. Such pressure could be monitored anywhere between the downstream side of the pump and side of the valves towards the bag.

FIG. 2 shows a substrate 12 such as a pipe around which has been installed a recoverable sleeve 1 and the preferred bag 2. Longitudinal edge portions 13 are shown abutting in order to hold the bag wrapped around the sleeve.

FIGS. 3a and 3b show two ways in which a single size of bag can be used to recover a smaller size of recoverable article. In these figures the extreme edges of the bag do not abut, but instead portions 14, some distance from the edge are held together. The arrangement of FIG. 3a is preferred for most applications.

FIG. 4 is a cut-away perspective view of a preferred bag. The bag 2 is wrapped around a recoverable article 1 so that an inner surface 16 conforms to the article. An outer surface 15 is supported by a canvas support 17 reinforced by a series of longitudinally arranged slats 18. The longitudinal edges 13 of the bag are held together by means not shown in the drawing. A supply pipe 3 is shown entering the bag through one of the longitudinal edges 13 and extending through the interior of the bag so that liquid 4 can be supplied directly to the region under the article 1 and mid-way between the two edges 13. Vent or drain pipes 5 and 6 are shown leading directly to the tops of the two limbs of the bag 19 and 20.

FIG. 5 shows a way by which the slats 18 can be used to hold opposing edge portions 14 together around the substrate and to support the weight of the liquid with respect to the article to be recovered. The article is a sleeve 1 around a pipe 21. The pipe 21 carries a frame 22 at each end of the bag into which can be inserted the appropriate slats to achieve the correct cross-sectional diameter of bag. Although the drawing shows one slat 23 at each edge portion within the frame 22, it may be desirable that the parts of the bag above the pipe be clamped together completely by inserting further slats within the frame 22. The reason for this is that liquid would be substantially prevented from flowing into the edge portions 14 where it is not needed.

What is claimed is:

1. A device for recovering a heat recoverable article which comprises:
   (a) a container impermeable to hot fluid which has a flexible surface that can be wrapped around the article;
   (b) a closure means for holding opposite edge portions of the container to cause said surface to maintain the wrapped configuration;
   (c) a conduit for introducing fluid directly to a region of the container substantially midway between said edge portions;
   (d) means for supporting the weight of said fluid;
   (e) means for venting the container at each of said opposite edge portions; and
   (f) means for maintaining a pressure within the container to thereby cause the flexible surface to conform to the changing size and shape of the heat-recoverable article as it recovers.

2. A device according to claim 1, in which the container is a substantially closed bag.

3. A device according to claim 1, in which the container comprises a silicone rubber.

4. A device according to claim 1, in which the container comprises a silicone rubber of thickness 0.5 to 1.0 mm.

5. A device according to claim 1, in which the means for supporting comprises a substantially non-resilient sheet material adjacent to the side of the container opposite said flexible surface.

6. A device according to claim 5, in which the means for supporting additionally comprises a plurality of spaced apart longitudinal slats.

7. A device assembly according to claim 6, in which the closure means comprises clamping means into which slats adjacent said opposite edge portions can be placed.

8. A device according to claim 1, in which the conduit includes a valve.

9. A device according to claim 1, in which each means by which the container can be vented includes a valve.

10. An assembly for recovering a heat-recoverable article, which comprises:
   (1) a device, comprising:
      (a) a container impermeable to hot fluid which has a flexible surface that can be wrapped around the article;
      (b) closure means for holding opposite edge portions of the container to cause said surface to maintain the wrapped configuration;
      (c) means for supporting the weight of said fluid;
      (d) a conduit by means of which fluid can be introduced directly to a region of the container substantially midway between said edge portions; and
      (e) means by which the container can be vented directly at each of said edge portions;
      (f) means for maintaining a pressure within the container to thereby cause the flexible surface to conform to the changing size and shape of the heat-recoverable article as it recovers,
   (2) a heater for said fluid, having an outlet which can be connected to said conduit, and an inlet which can be connected to each of said means (e).

11. An assembly according to claim 10, in which said heater has a pump for supplying fluid to the outlet.

12. An assembly according to claim 11, in which the pump can be reversed to withdraw fluid from the outlet.

13. An assembly according to claim 10, having means for controlling flow of fluid through the outlet and through each of the means (e).

14. An assembly according to claim 13, in which the means for controlling flow is operated by a pressure sensor which measures the pressure of fluid in the container.

* * * * *